United States Patent [19]
Lin et al.

[11] Patent Number: 5,726,595
[45] Date of Patent: Mar. 10, 1998

[54] CIRCUIT FOR COUPLING AN EVENT INDICATION SIGNAL ACROSS ASYNCHRONOUS TIME DOMAINS

[75] Inventors: Allan Lin, San Jose; L. Vincent Xie, Fremont, both of Calif.

[73] Assignee: National Semiconductor Corporation, Santa Clara, Calif.

[21] Appl. No.: 745,270

[22] Filed: Nov. 8, 1996

[51] Int. Cl.⁶ ........................................... H04L 7/02
[52] U.S. Cl. ..................... 327/155; 327/141; 327/145; 327/161; 327/176
[58] Field of Search ........................ 327/141, 144, 327/145, 100, 146, 155, 161, 172, 165, 166, 176

[56] References Cited

U.S. PATENT DOCUMENTS

| | | | |
|---|---|---|---|
| 4,928,290 | 5/1990 | Vo | 327/141 |
| 5,388,225 | 2/1995 | Cantrell et al. | 395/325 |

*Primary Examiner*—Timothy P. Callahan
*Assistant Examiner*—Dinh T. Le
*Attorney, Agent, or Firm*—Limbach & Limbach L.L.P.

[57] ABSTRACT

A circuit is for re-synchronizing an event indication signal received from a foreign domain to generate a result indication signal that is re-synchronized to a host clock signal. The event indication signal is received from the foreign domain at a first input terminal; and a host clock signal is received at a second input terminal. Edge-triggered flip flop circuitry of the circuit has a clock input, a data input, and a data output. The clock input is coupled to the second input terminal and the data input is coupled to receive a latch output signal. The edge-triggered flip flop circuitry clocks the latch output signal to the data output of the flip flop circuitry, to generate a result event indication signal, in response to a transition in the host clock signal. Delay circuitry is coupled to the first input terminal to receive the event indication signal. The delay circuitry provides a delayed event indication signal having a phase that is delayed from the event indication signal. Transparent latch circuitry latches the delayed event indication signal responsive to a latch control signal, and combination circuitry is coupled to receive the event indication signal and the result event indication signal, and provides a combination thereof as the latch control signal.

8 Claims, 5 Drawing Sheets

CIRCUIT FOR COUPLING AN EVENT INDICATION SIGNAL ACROSS ASYNCHRONOUS TIME DOMAINS

TECHNICAL FIELD

The present invention relates to a circuit for coupling an event indication signal (such as a pulse that indicates occurrence of an external interrupt event) across asynchronous time domains and, in particular, for performing such coupling for event indication signals of relatively short duration.

BACKGROUND

Synchronous systems are well known in the art. In particular, in a synchronous system, all components within a particular "domain" operate synchronously to a single clock signal, where the "domain" includes a group of logic elements including "sequential elements" and "combinatorial elements". Sequential elements (e.g., registers, latches, flip-flops, and static RAMS) are capable of memorizing past information responsive to a level or edge of a clock "beat". On the other hand, combinatorial elements have no memory, but they are capable of making logic judgements. An example of a domain is an interface circuit for interfacing an external device, such as a printer, to a processor.

Different domains are asynchronous to each other, while each domain may be internally synchronous, either operating responsive to an internal clock or without a clock. For example, using the example of the printer and the interface circuit, the printer and the interface circuit are asynchronous to each other because the printer circuit has no knowledge whatsoever of the interface circuit's internal clock. It is well-known that external devices may indicate an event (e.g., being ready to receive another print character) by providing an interrupt signal to the interface circuit. The interface circuit latches the interrupt pulse at the next appropriate point (e.g., rising edge) in the cycle of the interface circuit's internal clock. Only after the processor latches the interrupt and causes the interface circuit to acknowledge the interrupt to the external device does the external device cancel the interrupt.

However, in some situations, an external device provides only a short duration pulse as a legal indication that an event has occurred and the pulse would not have sufficient length for conventional "re-synchronizing logic" in an interface circuit to recognize and latch the external event. One solution to this problem would be to increase the frequency of the interface circuit's internal clock so that the external event signal is sampled more frequently and the interface circuit would be more likely to catch the external event pulse. However, the cost of increasing the frequency of the interface circuit's clock is great and, in any event, the amount by which the clock frequency can be increased is limited by the technology in existence at any particular time.

SUMMARY

The present invention is a circuit, operating at the input of a host domain, for re-synchronizing an event indication signal received from a foreign domain (operating asynchronously to the host domain). The circuit in accordance with the invention generates a result indication signal that is re-synchronized to a host clock signal. The event indication signal is received from the foreign domain (which is asynchronous to the host domain) at a first input terminal of the host domain; and a host clock signal is received at a second input terminal of the host domain.

Edge-triggered flip flop circuitry of the circuit has a clock input, a data input, and a data output. The clock input is coupled to the second input terminal and the data input is coupled to receive a latch output signal. The edge-triggered flip flop circuitry clocks the latch output signal to the data output of the flip flop circuitry, to generate a result event indication signal, in response to a transition in the host clock signal.

Delay circuitry is coupled to the first input terminal to receive the event indication signal. The delay circuitry provides a delayed event indication signal having a phase that is delayed from the event indication signal. Transparent latch circuitry latches the delayed event indication signal responsive to a latch control signal, and combination circuitry is coupled to receive the event indication signal and the result event indication signal, and provides a combination thereof as the latch control signal.

DETAILED DESCRIPTION

Figure 1:
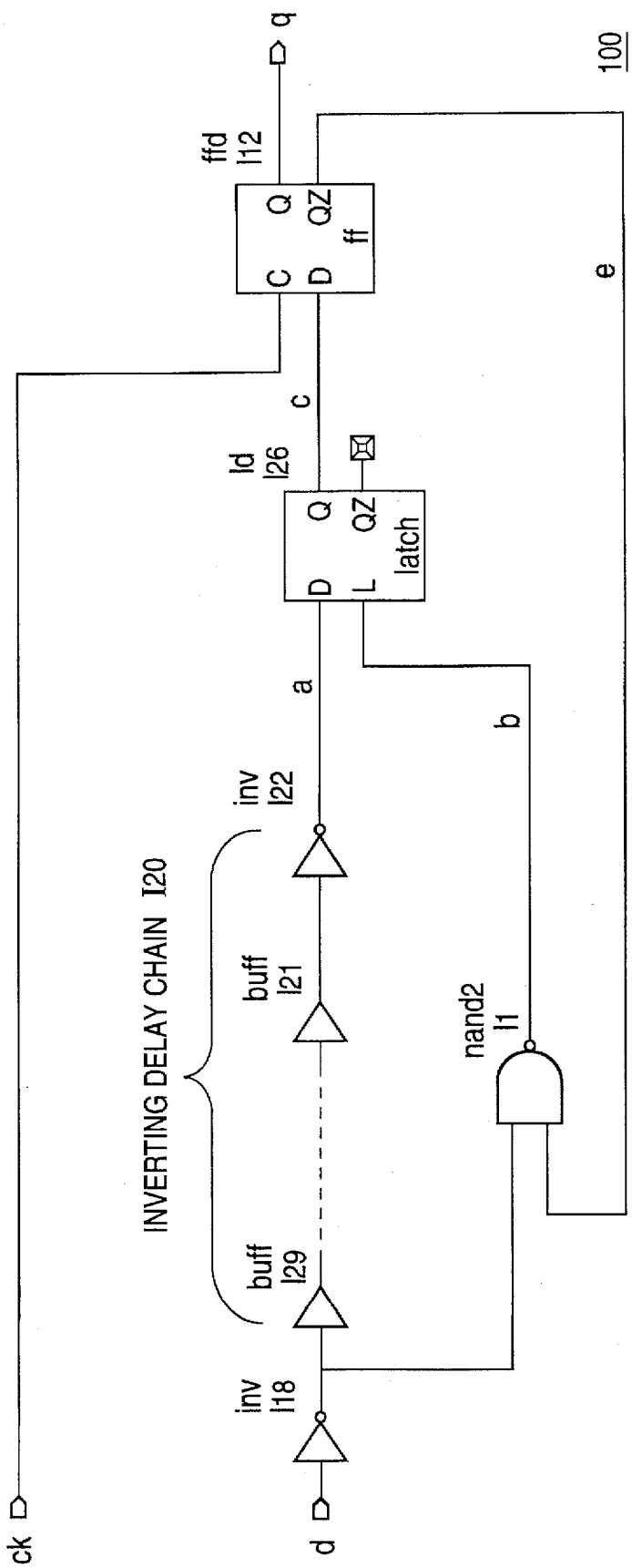
FIG. 1 schematically illustrates an embodiment of the invention for re-synchronizing active-high event indication pulses.

FIG. 1 schematically illustrates an embodiment of a circuit 100, in accordance with the invention, for re-synchronizing an active-high pulse that is an externally-generated event indication signal provided to a "d" input of the circuit 100. The active high pulse is re-synchronized to a host clock signal, provided at a ck input of the circuit 100, and to which, for example, all of the components of a domain in which the circuit 100 exists are synchronized. The circuit 100 generates a re-synchronized event indication signal at an output "q" of the circuit 100.

The circuit 100 includes an inverter I18 coupled to receive and invert the event indication signal. The output of the inverter I18 is coupled to an inverting delay chain I20 that includes, for example, a plurality of buffers (shown in FIG. 1 as I29 through I21) and an inverter (shown in FIG. 1 as I22) connected in serial. The output of the inverting delay chain I20 (signal "a") is provided to the data input "D" of a transparent latch I26. The transparent latch I26 is controlled by a latch control signal (signal "b") provided from the output of a two-input NAND device I1 to the control input "L" of the latch I26.

The output of the transparent latch I26 (signal "c") is provided to the data input "D" of an edge-triggered flip flop I12. The clock input "C" of the edge-triggered flip flop I12 is coupled to the "ck" input of the circuit 100 to receive the host clock signal. The data output "Q" of the edge-triggered flip flop I12 is provided to the output "q" of the circuit 100 as the re-synchronized event indication signal.

The output of the inverter I18, in addition to being provided to the inverting delay chain I20, is also provided to a first input A1 of the two-input NAND device I1. The inverting data output "QZ" of the edge-triggered flip flop I12 is provided as a second input A2 to the two-input NAND device I1. The two-input NAND device I1 provides the latch control signal (signal "b") responsive to a combination of the signal output from the inverter I18 and of the signal "e"

output from the inverting data output "QZ" of the edge triggered flip flop I12.

The operation of the circuit 100 is now described. Some timing parameters, used in describing the operation of the circuit 100, are as follows:

Tck: the period of the host clock provided at the "ck" input of the circuit 100;

Tp: the amount of time between recurring active edges of pulses of the event indication signal provided at the "d" input of the circuit 100;

Tn: the inactive state time of the event indication signal;

Tw: the width of each pulse of the event indication signal;

t_pd_lh: the low-to-high propagation delay of the inverting delay chain I20;

t_pd_hl: the high-to-low propagation delay of the inverting delay chain I20;

t_nand2_A1_hl:: the high-to-low propagation delay of the NAND device I1 from its A1 input;

t_setup_h: the rising edge D to L setup time of the transparent latch I26;

t_hold_h: the rising edge D to L hold time of the transparent latch I26.

Referring still to FIG. 1, as discussed above, the circuit 100 has two inputs, "d" and "ck", and one output, "q". The input "d" receives the event indication signal. The event indication signal includes asynchronous active-high pulses generated by the foreign domain. The input "ck" receives the host clock signal generated by (or at least synchronous to) the host domain. The output "q" provides the re-synchronized event indication signal in the host domain.

Figure 4:
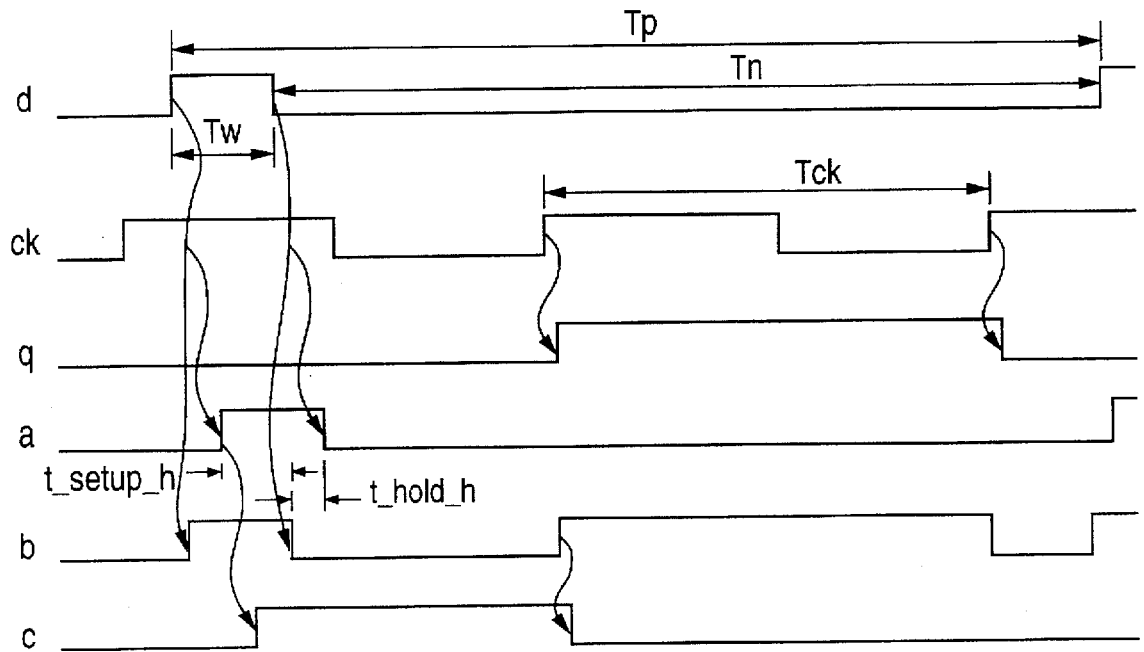
FIGS. 4 and 5 are timing diagrams which illustrate the operation of the circuits of FIGS. 1 and 2, respectively.

Referring still to FIG. 1, and also to FIG. 4 (which is a timing diagram that illustrates the operation of the FIG. 1 circuit 100), it is assumed that the circuit 100 begins from its inactive state with the event indication signal provided at the "d" input of the circuit 100 being in an inactive state (i.e., "low"); the signal provided from the data output of the transparent latch I26 (signal "c") being "low"; and the signal provided at the output of the flip flop I12 (i.e., at the "q" output of the circuit 100) also being "low". That is, in the presence of a clock signal at the "ck" input of the circuit 100 and while the event indication signal provided at the "d" input to circuit 100 remains inactive, the only possible stable state of the signal provided at "q" output of the circuit 100 and of signal "c" provided at the data output of the latch I26 is "low". Thus, the signal "e" provided from the inverted data output "QZ" of the flip flop I12 has an initial state of "high". Also, in the initial state, the signal provided at input A1 of NAND device I1, from the output of inverter I18, is initially "high" due to the event indication signal provided at input "d" of the circuit 100 being initially inactive ("low"). As a result, the signal "b" output from NAND device I1 is initially "low" and, since the signal "b" is provided to the control input "L" of the latch I26, the latch I26 is closed.

A leading (rising) edge of a event indication signal pulse provided to the "d" input of the circuit 100 (the pulse causes a "low" level to be provided to the first input A1 of the NAND device I1) causes NAND device I1 to provide signal "b" having a "high" level at the output of the NAND device I1. The "high" level of the signal "b", provided to the control input "L" of the latch I26, causes the transparent latch I26 to open.

Meanwhile, the rising edge of the event indication signal pulse propagates through the delay chain I20 and is propagated as the signal "c" provided from the data output Q of the now-open transparent latch I26. The rising edge of signal "c" is propagated from the input "D" of the edge-triggered flip flop I12 to the output "Q" of the edge-triggered flip-flop I12 responsive to rising edge of the host clock signal, received at the "ck" input of the circuit 100 and provided to the C input of the flip-flop I12.

If the event indication signal pulse extends after the next rising edge of the host clock signal, provided to the "ck" input of the circuit 100, the "high" output level of the Q output of edge-triggered flip-flop I12 is held until the trailing (falling) edge of the event indication signal pulse is propagated through the transparent latch I26 (i.e., the output signal "c" of the transparent latch I26 goes low) and docked through to the output of the flip flop I12. That is, the trailing edge of the event indication signal pulse being clocked through to the output of the flip flop I12 causes the signal provided from the Q output of the flip flop I12 to go "low" and, thus, causes the "e" signal from the QZ output to go "high". The "e" signal going "high" causes the output signal "b" from the NAND device I1 to go low to close the transparent latch I26. With the transparent latch I26 closed, the signal output from the latch I26 (signal "c") remains low. As described above with regard to the initial "reset" state of the circuit 100, the only possible state of the signal provided from the latch I26 (signal "c") and the output signal of the flip flop I12 (i.e., from output "Q") are "low" while "d" remains inactive.

By contrast, if event indication signal pulse ends before the next rising edge of the host clock signal, provided to the "ck" input of the circuit 100 (i.e., before the flip flop I12 samples the "high" level of the "c" signal provided from the transparent latch I26), the "low" level of the event indication signal, provided to the A1 input of the NAND device I1, will cause the output signal "b" of the NAND device I1 to go "low" (as ensured by equation 4, discussed later), which closes the transparent latch I26 and preserves the "high" level of the "c" signal. The preserved "high" level of the "c" signal is then sampled by the flip flop I12 at the next rising edge of the host clock provided at the "ck" input of the circuit 100, thereby resets "c" and completes the resynchronization.

In summary, the circuit can reliably resynchronize very short pulses, and even preserve the pulse size (limited to the resolution of the clock).

The following conditions are placed on the event input signal, the host clock provided to the "ck" input of the circuit 100, and the elements of the circuit 100:

| (1) | Tp > 2*tck | the frequency of pulses in the event indication signal must be less than half that of the host clock frequency; and |
|---|---|---|
| (2) | Tn > Tck | the minimum inactive time of the event input signal must be longer than the clock period. |

The satisfaction of conditions (1) and (2) ensures that adjacent event indication pulses at "d" can be distinguished by resynchronization at the "Q" output of the flip flop I12.

(3) Tw>t_pd_lh+t_setup_h-t_nand2_A1_hl minimum pulse width;

Condition (3) is limited only by the technology (i.e., the fabrication process) of the integrated circuit into which the invention is implemented. The satisfaction of condition (3) ensures that each event indication pulse can be reliably detected.

(4) t_pd_hl>t_nand2_A1_hl+t_hold_h minimum delay of inverting delay chain I20.

Condition (4) is effected by design. The satisfaction of condition (4) ensures that the latch I26 will capture an event indication pulse even if the event indication pulse terminates before the next rising edge of the host clock provided at the "ck" input of the circuit 100.

Assuming that t_pd_lh is equal to t_pd_hl, and substituting condition (4) into condition (3), yields that tw>t_setup_h+t_hold_h. It can thus be seen that Tw can be as small as the setup and hold window of the latch I26. (The setup and hold window of the latch I26 are scaleable as fabrication technology advances.)

Figure 2:
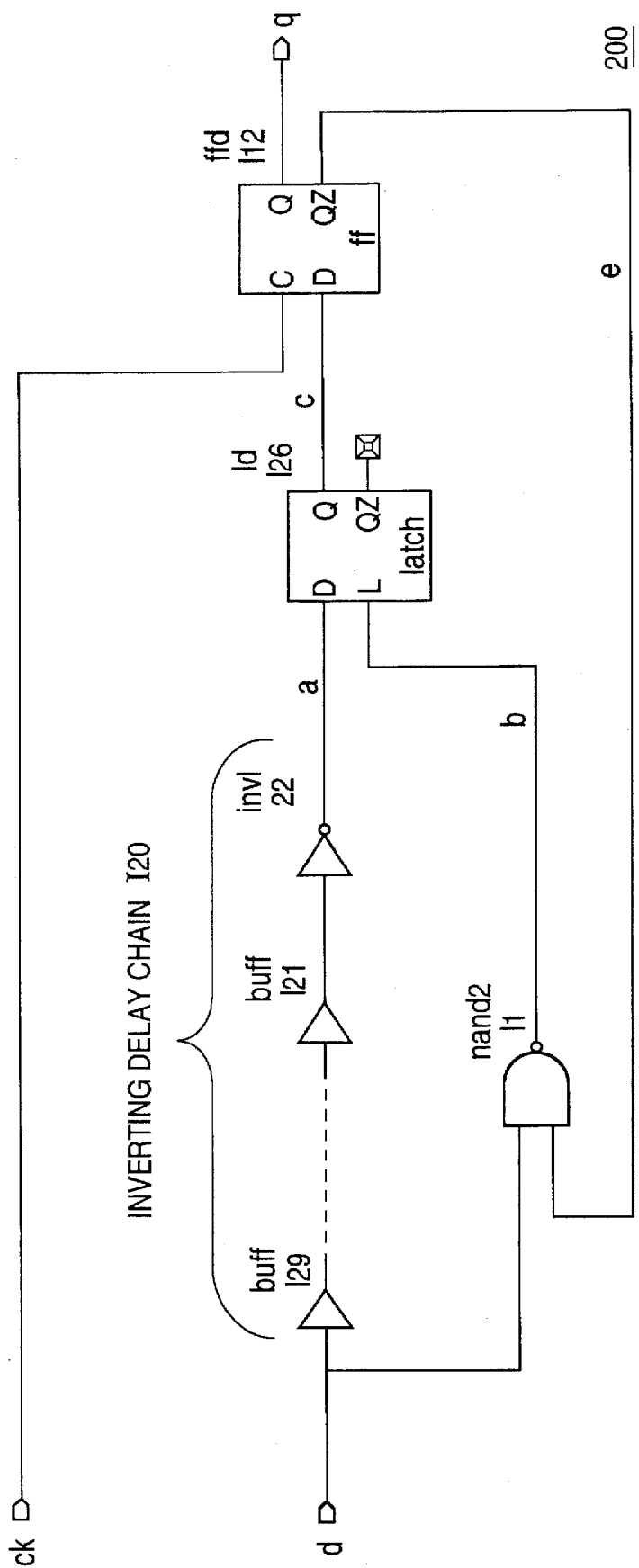
FIG. 2 schematically illustrates an embodiment of the invention for re-synchronizing active-low event indication pulses.
Figure 5:
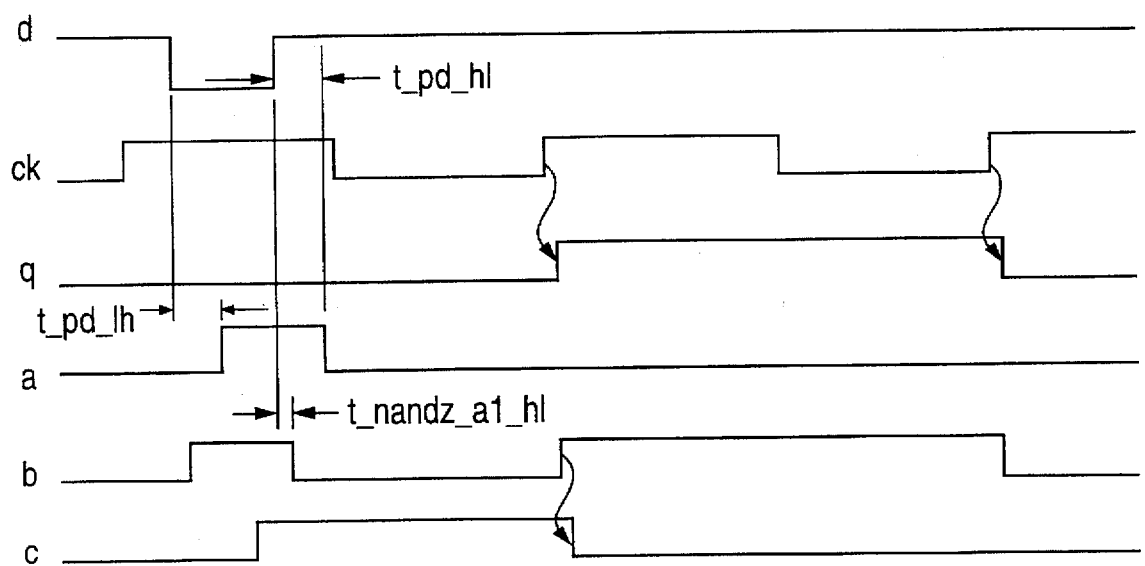

FIG. 2 schematically illustrates an embodiment of a circuit 200, in accordance with the invention, for re-synchronizing active-low pulses. The circuit 200 is virtually identical to the circuit 100 of FIG. 1, except that the circuit 200 does not include the inverter 118. The principle of operation of the circuit 200 is similar to the principle of operation of the circuit 100. FIG. 5 is a timing diagram that illustrates the operation of the circuit 200.

Figure 3:
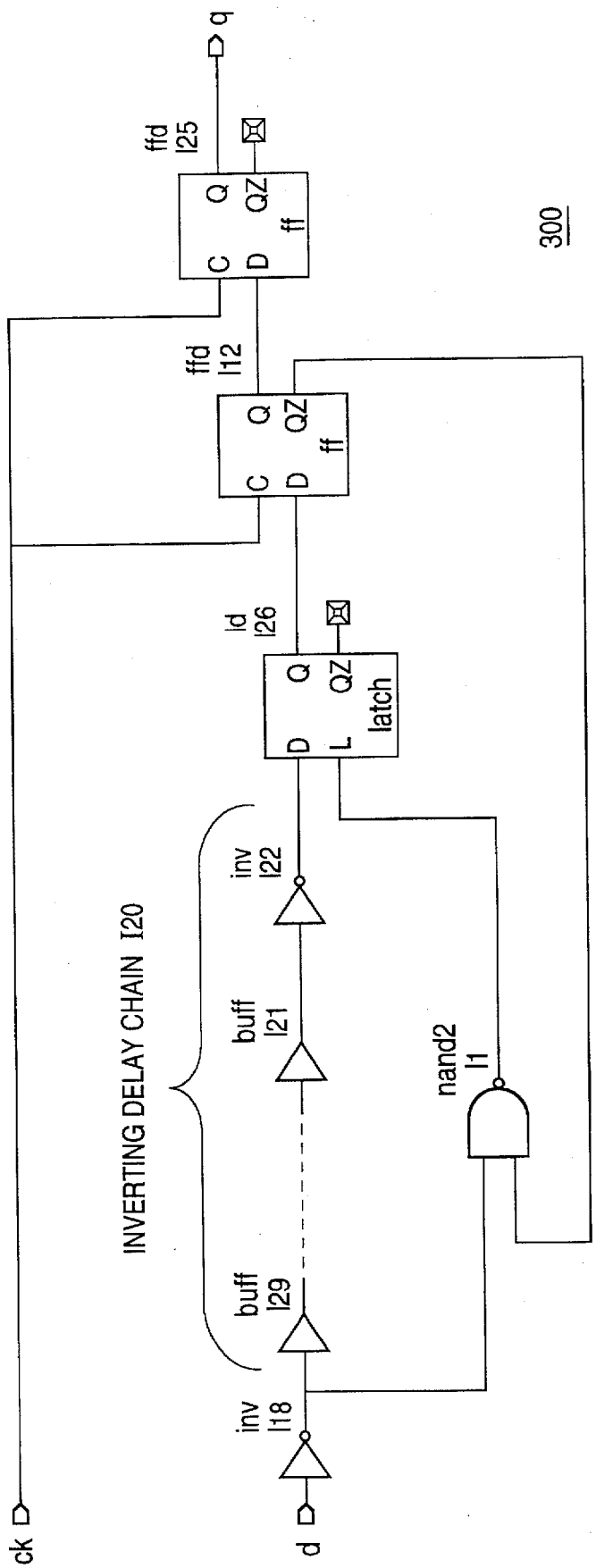
FIG. 3 schematically illustrates a further embodiment of the circuit of FIG. 1, including metastability-proof circuitry.

FIG. 3 illustrates a further embodiment, in accordance with the invention, for re-synchronizing active-high pulses that are included in an externally-generated event indication signal provided to a "d" input of the circuit 300. The FIG. 3 circuit is virtually identical to the circuit 100 of FIG. 1, except that the circuit 200 includes an additional edge triggered flip-flop I25, that has the well-known effect of adding metastability proof. The additional flip flop I25 delays the re-synchronization by one cycle of the host clock signal provided at the "ck" input of the circuit 300.

Figure 6:
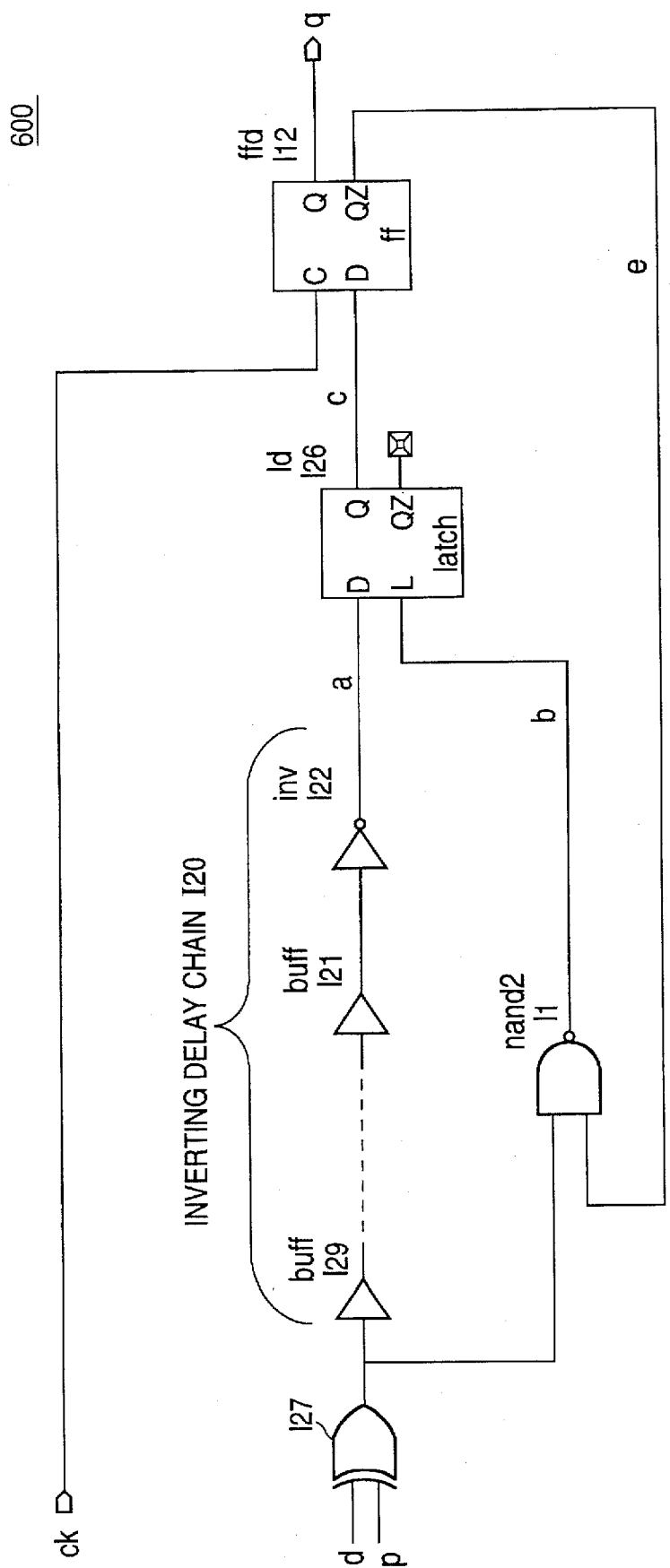
FIG. 6 schematically illustrates an embodiment of the invention that is configurable for re-synchronizing either active-high event indication pulses or active low event indication pulses.

FIG. 6 schematically illustrates an embodiment of a circuit 600, in accordance with the invention, for re-synchronizing either an active-high pulse or an active-low pulse. (Where the components in FIG. 6 are the same as those of the other figures, they are given the same reference designations.) In particular, the circuit 600 includes a two input XOR device I27. A "d" input of the XOR device I27 is coupled to receive the external event indication signal pulse, and a "p" input is coupled to receive a polarity control signal. When the polarity control signal provided at the "p" input of the XOR device I27 is "low", the event indication signal pulse provided at the "d" input of the XOR device I27 is unchanged as it is passed through the XOR device I27 to the output of the XOR device I27. Thus, when the polarity control signal provided at the "p" input of the XOR device I27 is "low", the circuit 600 is configured to function like the circuit 200 illustrated in FIG. 2.

By contrast, when the polarity control signal provided at the "p" input of the XOR device I27 is "high", the event indication pulse provided at the "d" input of the XOR device I27 is inverted (as if it had passed through an inverter such as the inverter I18 of the circuit 100, illustrated in FIG. 1) as it is passed through the XOR device I27 to the output of the XOR device I27. Thus, when the polarity control signal provided at the "p" input of the XOR device I27 is "high", the circuit 600 is configured to function like the circuit 100 illustrated in FIG. 1.

In summary, with a circuit in accordance an embodiment of the present invention, pulses down to the size limited by (3) or, more descriptively, by (5) can be reliably resynchronized. The pulse size at the "Q" output of the flip flop I25 is preserved to the number of clock cycles nearest to the size of the input pulse. It should be understood that various alternatives to the embodiments of the invention described herein may be employed in practicing the invention. It is intended that the following claims define the scope of the invention and that methods and apparatus within the scope of these claims and their equivalents be covered thereby.

What is claimed is:

1. A circuit for re-synchronizing an event indication signal received from a foreign domain, to generate a result indication signal that is re-synchronized to a host clock signal, the circuit comprising:

a first input terminal to receive the event indication signal from foreign domain;

a second input terminal to receive the host clock signal;

an output terminal;

edge-triggered flip flop circuitry, having a clock input, a data input, and a data output, the clock input coupled to the second input terminal the data input coupled to receive a latch output signal, that clocks the latch output signal to the data output of the flip flop circuitry, to generate a result event indication signal at the output terminal, in response to a transition the host clock signal;

delay circuitry coupled to the first input terminal to receive the event indication signal, that provides a delayed event indication signal having a phase that is delayed from the event indication signal;

transparent latch circuitry that latches the delayed event indication signal responsive to a latch control signal for providing said latch output signal; and combination circuitry coupled to receive the event indication signal and the result event indication signal and that provides a combination thereof as the latch control signal.

2. The circuit of claim 1, and further including:

inverter circuitry at the first input terminal that inverts the event indication signal to generate an inverted event indication signal and that provides the inverted event indication signal as the event indication signal.

3. The circuit of claim 1 or 2, wherein the combination circuitry has a first data input, a second data input and a data output, the first input coupled to receive the event indication signal and the second input coupled to receive the result event indication signal, wherein the combination circuitry provides, at the data output of the combination circuitry, a NAND function of the event indication signal and an inverted signal of the result event indication signal as the latch control signal.

4. The circuit of claim 1 or 2, wherein the delay circuitry includes a plurality of buffer circuits and a plurality of inverter circuits, connected in serial.

5. The circuit of claim 1 or 2, wherein the edge-triggered flip flop circuitry is first edge-triggered flip-flop circuitry, and further including:

second edge-triggered flip flop circuitry, having a clock input, a data input and a data output, the clock input coupled to the second input terminal and the data input coupled to the data output of the first edge-triggered flip-flop circuitry, wherein a metastability-proofed result event indication signal is provided at the data output of the second edge-triggered flip-flop circuitry.

6. The circuit of claim 1, and further including:

enablable inverter circuitry coupled to the first input terminal and responsive to a polarity control signal, that provides to the delay circuitry and the combination circuitry, the event indication signal when the polarity control signal has a first polarity: and an inverted signal of the event indication signal when the polarity control signal has a second polarity.

7. The circuit of claim 6, wherein the enablable inverter circuitry is XOR circuitry that provides the event indication signal to the delay circuitry and the combination circuitry when the polarity control signal has a first state, and provides the event indication signal, inverted, to the delay circuitry and the combination circuitry when the polarity signal has a second state, opposite the first state.

8. The circuit of claim 7, wherein the polarity control signal in the first state has a low level and the polarity signal in the second state has a high level.

* * * * *

UNITED STATES PATENT AND TRADEMARK OFFICE
CERTIFICATE OF CORRECTION

PATENT NO. : 5,726,595
DATED : March 10, 1998
INVENTOR(S) : Allan Lin et al.

It is certified that error appears in the above-identified patent and that said Letters Patent is hereby corrected as shown below:

In Col. 5, line 66, after "from" insert --the--.

In Col. 6, line 4, after "terminal" insert --and--.

In Col. 6, line 8, after "transition" insert --in--.

Signed and Sealed this

Twenty-sixth Day of May, 1998

*Attest:*

BRUCE LEHMAN

*Attesting Officer*      *Commissioner of Patents and Trademarks*